United States Patent
Suciu et al.

(10) Patent No.: US 10,161,358 B2
(45) Date of Patent: Dec. 25, 2018

(54) TWIN TARGET THRUST REVERSER MODULE

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 490 days.

(21) Appl. No.: 14/773,958

(22) PCT Filed: Mar. 13, 2014

(86) PCT No.: PCT/US2014/025163
§ 371 (c)(1),
(2) Date: Sep. 9, 2015

(87) PCT Pub. No.: WO2014/197056
PCT Pub. Date: Dec. 11, 2014

(65) Prior Publication Data
US 2016/0040626 A1    Feb. 11, 2016

Related U.S. Application Data

(60) Provisional application No. 61/781,255, filed on Mar. 14, 2013.

(51) Int. Cl.
*F02K 1/70* (2006.01)
*F02K 1/60* (2006.01)
(Continued)

(52) U.S. Cl.
CPC ............ *F02K 1/70* (2013.01); *F02K 1/06* (2013.01); *F02K 1/52* (2013.01); *F02K 1/60* (2013.01);
(Continued)

(58) Field of Classification Search
CPC ...... F02K 1/70; F02K 1/06; F02K 1/62; F02K 1/60; F02K 1/763; F02K 1/52; F05D 2240/40
See application file for complete search history.

(56) References Cited

U.S. PATENT DOCUMENTS 3,057,150 A * 10/1962 Horgan .................. F02K 1/12
                                                239/127.3
3,312,429 A *  4/1967 Hull, Jr. ................. F02K 1/68
                                                239/265.29
(Continued)

FOREIGN PATENT DOCUMENTS

GB       2445555 A       7/2008
WO    86/00862 A1       2/1986

OTHER PUBLICATIONS https://en.wikipedia.org/w/index.php?title=Turbofan&oldid=473674816, pp. 1-2.*
(Continued)

*Primary Examiner* — Carlos A Rivera
(74) *Attorney, Agent, or Firm* — Carlson, Gaskey & Olds, P.C.

(57) ABSTRACT

A nozzle assembly for a dual gas turbine engine propulsion system includes a housing mountable proximate to a first bypass passage of a first gas turbine engine and a second bypass passage of a second gas turbine engine, first and second upper doors, and first and second lower doors. Each of the first and second upper doors and the first and second lower doors are pivotally mounted to the housing for movement between a stowed position and a deployed position in which airflow through the first and second bypass passages is redirected relative to respective centerline axes of the first and second gas turbine engines.

4 Claims, 6 Drawing Sheets

(51) Int. Cl.
  *F02K 1/62* (2006.01)
  *F02K 1/06* (2006.01)
  *F02K 1/52* (2006.01)

(52) U.S. Cl.
  CPC .......... *F02K 1/62* (2013.01); *F05D 2220/323* (2013.01); *F05D 2240/40* (2013.01)

(56) References Cited

U.S. PATENT DOCUMENTS

| | | | |
|---|---|---|---|
| 3,352,514 A * | 11/1967 | Maguire | B64D 27/20 239/265.19 |
| 4,865,256 A | 9/1989 | Durand et al. | |
| 5,778,659 A | 7/1998 | Duesler et al. | |
| 5,943,856 A * | 8/1999 | Lillibridge | B64D 33/06 181/220 |
| 6,381,950 B1 | 5/2002 | Whaites et al. | |
| 6,688,099 B2 | 2/2004 | Lair | |
| 8,104,261 B2 | 1/2012 | Marshall et al. | |
| 8,109,466 B2 | 2/2012 | Aten et al. | |
| 8,127,532 B2 | 3/2012 | Howe | |
| 8,151,551 B2 | 4/2012 | Pero | |
| 8,172,175 B2 | 5/2012 | Lair | |
| 9,352,843 B2 * | 5/2016 | Suciu | F02K 3/06 |
| 9,845,159 B2 * | 12/2017 | Suciu | B64D 27/20 |
| 9,897,040 B2 * | 2/2018 | Suciu | F02K 1/60 |
| 2002/0184874 A1 | 12/2002 | Modglin et al. | |
| 2007/0018034 A1 * | 1/2007 | Dickau | B64C 15/02 244/12.3 |
| 2007/0051091 A1 | 3/2007 | Rolt | |
| 2012/0079805 A1 | 4/2012 | Stuart et al. | |
| 2012/0137655 A1 | 6/2012 | Pero | |
| 2013/0097998 A1 * | 4/2013 | Marche | F02K 1/70 60/226.2 |

OTHER PUBLICATIONS

International Search Report and Written Opinion for International Application No. PCT/US2014/025163 dated Dec. 18, 2014.
International Preliminary Report on Patentability for International Application No. PCT/US2014/025163 dated Sep. 24, 2015.
European Search Report for EP Application No. 14807682.1 dated Oct. 26, 2016.

* cited by examiner

TWIN TARGET THRUST REVERSER MODULE

STATEMENT REGARDING FEDERALLY SPONSORED RESEARCH OR DEVELOPMENT

This invention was made with government support under NASA Cooperative Agreement No. NX11Ab35A. The Government has certain right in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Typically, the gas turbine engine is supported under an aircraft wing on either side of the fuselage. However, such under-wing installations may not be compatible with unique aircraft configurations. Accordingly, different mounting locations for the engines such as at the rear of the fuselage are being considered. Different mountings locations present different challenges and require alternate engine configurations.

A thrust reverser is utilized once an aircraft has landed, and creates a reverse thrust force to aid in slowing the aircraft. Typical thrust reversers and nozzles are components of the engine nacelle surrounding an under-wing mounted engine. Engines mounted within an aircraft fuselage do not include the same nacelle structures and therefore conventional thrust reversing devices may not be compatible.

Accordingly, it is desirable to design and develop structures that provide thrust reversing and variable nozzle functions for fuselage mounted engine configurations.

SUMMARY

A nozzle assembly for a dual gas turbine engine propulsion system according to an exemplary embodiment of this disclosure, among other possible things includes a housing mountable proximate to a first bypass passage of a first gas turbine engine and a second bypass passage of a second gas turbine engine, first and second upper doors, and first and second lower doors. Each of the first and second upper doors and the first and second lower doors are pivotally mounted to the housing for movement between a stowed position and a deployed position in which airflow through the first and second bypass passages is redirected relative to respective centerline axes of the first and second gas turbine engines.

In a further embodiment of the foregoing nozzle assembly, the first and second upper doors and the first and second lower doors close on a centerline of corresponding ones of the first and second bypass passages to redirect both bypass airflows and core airflows.

In a further embodiment of any of the foregoing nozzle assemblies, includes an actuator system configured to drive both the first and second upper doors and the first and second lower doors between the stowed and deployed positions.

In a further embodiment of any of the foregoing nozzle assemblies, the actuator system is disposed between the first and second engines.

In a further embodiment of any of the foregoing nozzle assemblies, includes two actuator systems disposed on opposite sides of the housing. Each actuator system is configured to drive the upper door and the lower door of a respective one of the first and second engines between the stowed and deployed positions.

In a further embodiment of any of the foregoing nozzle assemblies, includes three actuator systems for moving the first and second upper doors and the first and second lower doors between the stowed position and deployed position.

In a further embodiment of any of the foregoing nozzle assemblies, the first and second upper doors and the first and second lower doors are movable from the stowed position to an open position to increase an area of bypass flow.

In a further embodiment of any of the foregoing nozzle assemblies, each of the first and second upper doors and first and second lower doors are moved radially outward from the stowed position to the open position.

A nozzle assembly for a gas turbine engine propulsion system according to an exemplary embodiment of this disclosure, among other possible things includes a housing mountable proximate to a bypass passage of a gas turbine engine, and an upper door and a lower door pivotally mounted to the housing for movement between a first, stowed position, a second, deployed position for at least partially blocking airflow through the bypass passage, and a third, open position to increase an area of the bypass passage.

In a further embodiment of the foregoing nozzle assembly, when in the open position, an aft portion of each of the upper door and the lower door is positioned radially outward as compared to the stowed position.

In a further embodiment of any of the foregoing nozzle assemblies, the housing is mountable between first and second bypass passages corresponding to first and second gas turbine engines mounted side by side. The upper door includes first and second upper doors and the lower door includes first and second lower doors pivotally mounted to the housing.

An aircraft according to an exemplary embodiment of this disclosure, among other possible things includes a first gas turbine engine driving a first fan section, a second gas turbine engine driving a second fan section, first and second exit nozzles corresponding to each of the first and second gas turbine engines, and a downstream end of each of the first and second exit nozzles having upper and lower pivoting doors and at least one actuator to move the upper and lower pivoting doors between a stowed position and a deployed position in which the upper and lower doors inhibit airflow through the first and second exit nozzles to provide a thrust reverser.

In a further embodiment of the foregoing aircraft, the upper and lower pivoting doors are movable by the at least one actuator from the stowed position to an open position to increase a cross-sectional area of the first and second exit nozzles.

In a further embodiment of any of the foregoing aircrafts, the upper and lower pivoting doors are movable by the at least one actuator to vary a cross-sectional area of the first and second exit nozzles.

In a further embodiment of any of the foregoing aircrafts, each of the upper and lower doors are driven by the actuator through a linkage to move between the stowed position and the deployed position.

In a further embodiment of any of the foregoing aircrafts, each of the first and second gas turbine engines includes reverse flow core engines. Each reverse flow core engine respectively includes a compressor section, a combustor and a turbine section. Each of the turbine sections is closest to the corresponding one of the first and second fan sections, and relative to the respective turbine section, each of the combustor sections and the compressor sections is positioned further away from the corresponding one of the first and second fan sections.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
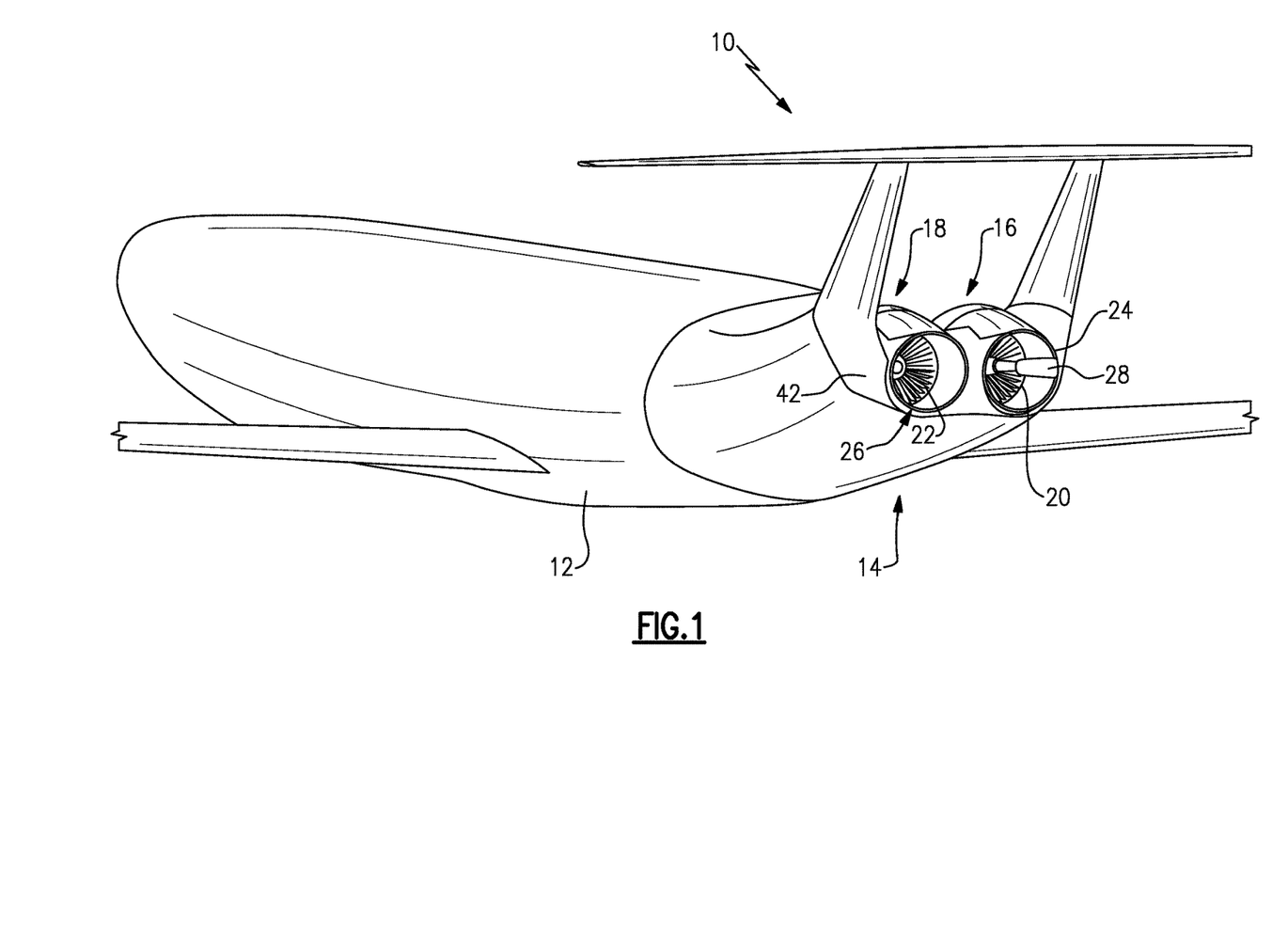
FIG. 1 schematically shows a proposed aircraft with gas turbine engine mount locations.

Referring to FIG. 1, an aircraft 10 includes a fuselage 12 with first and second gas turbine engines mounted in an aft end 14. The example aft mounted gas turbine engines 16, 18 include a configuration known as reverse flow. A first fan section 20 of the first gas turbine engine 16 drives propulsive flow through a first nozzle 24. A second fan section 22 driven by the second gas turbine engine 18 drives flow through a second nozzle 26. The first and second nozzles 24, 26 are in a side-by-side orientation and mounted to an aircraft structure 42 at the aft end 14.

Figure 2A:
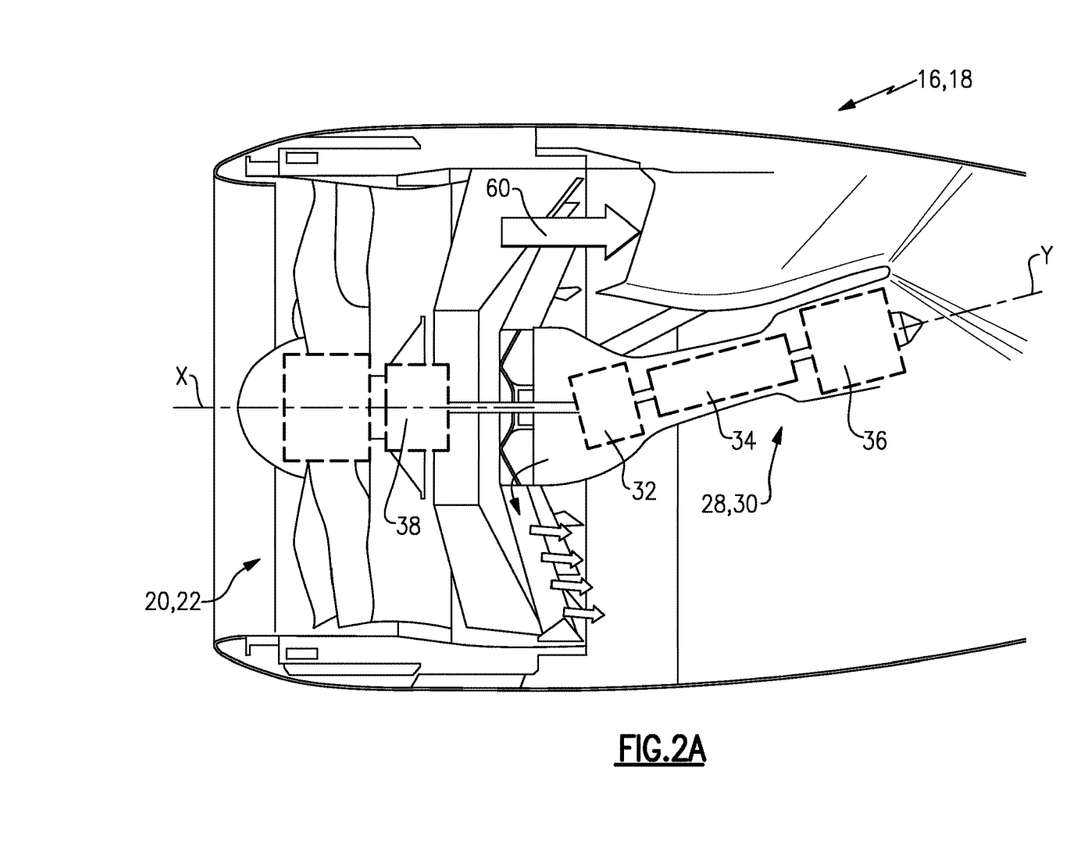
FIG. 2a is a schematic view of an example reverse flow gas turbine engine.
Figure 2B:
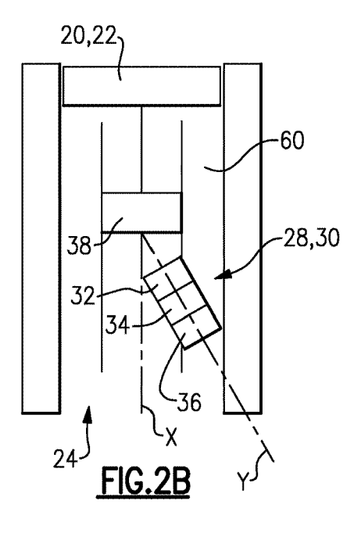
FIG. 2b is another schematic view of the example reverse flow gas turbine engine.

Referring to FIGS. 2A and 2B the example first and second gas turbine engines 16, 18 include the fan sections 20, 22 each of which rotates about a respective axis X. The first and second gas turbine engines include core sections 28, 30 that are orientated about a respective axis Y that is angled relative to axis X. Each of the first and second fan sections 20, 22 define a bypass passage 60 that directs airflow around respective ones of the core engine sections 28, 30.

The example first and second engines are "reverse flow engines" including a compressor section 36, a combustor section 34 and a turbine section 32. Just as in a typical gas turbine engine the compressor section 34 compresses incoming airflow that is combined with fuel in the combustor section 34. The air/fuel mixture is ignited in the combustor section 34 to produce high energy exhaust gases that drives the turbine section 32. The disclosed turbine section is axially forward of the compressor section 36 and the combustor section 34 and drives a gear reduction 38 that in turn drives the corresponding fan section 20, 22.

Figure 3:
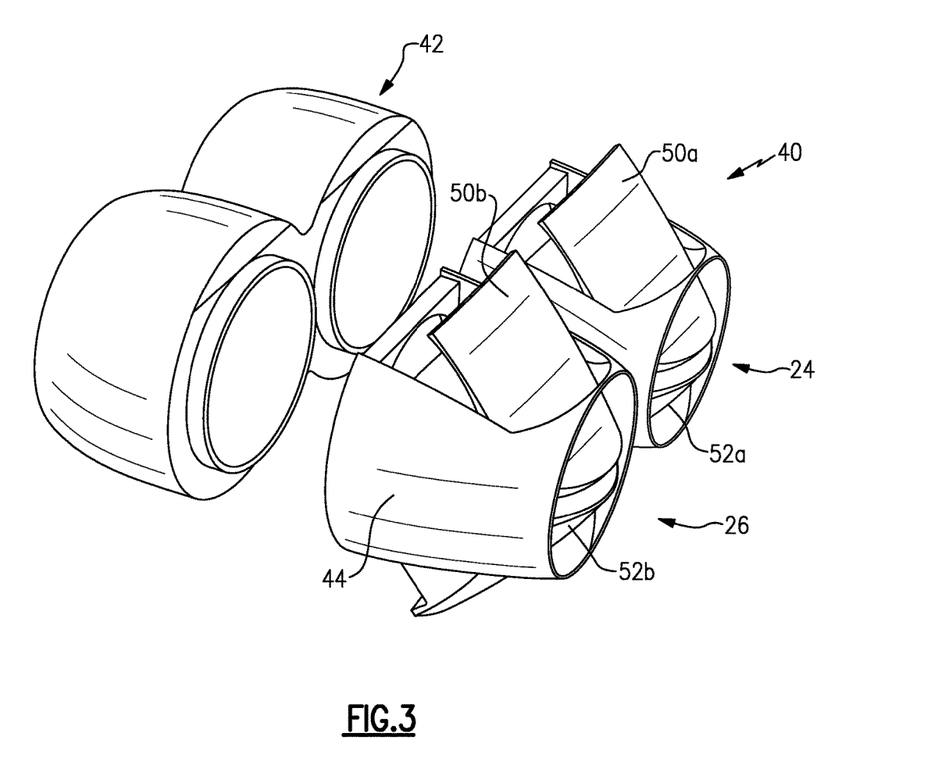
FIG. 3 is a perspective view of an example exit nozzle assembly.

Referring to FIG. 3, the propulsive thrust generated by the fan sections 20, 22 flows through a nozzle assembly 40. The nozzle assembly 40 includes a housing 44 that is attachable to the airframe structure 42. The nozzle assembly 40 includes the first nozzle 24 and the second nozzle 26 controlling propulsive flow from corresponding fan sections 20, 22.

First and second upper doors 50a, 50b and first and second lower doors 52a, 52b, which are mounted to corresponding first and second nozzles 24, 26, are movable to vary the cross-sectional area for propulsive flow. The first and second upper doors 50a, 50b and first and second lower doors 52a, 50b are pivotally mounted to the housing 44.

Figures 4, 5:
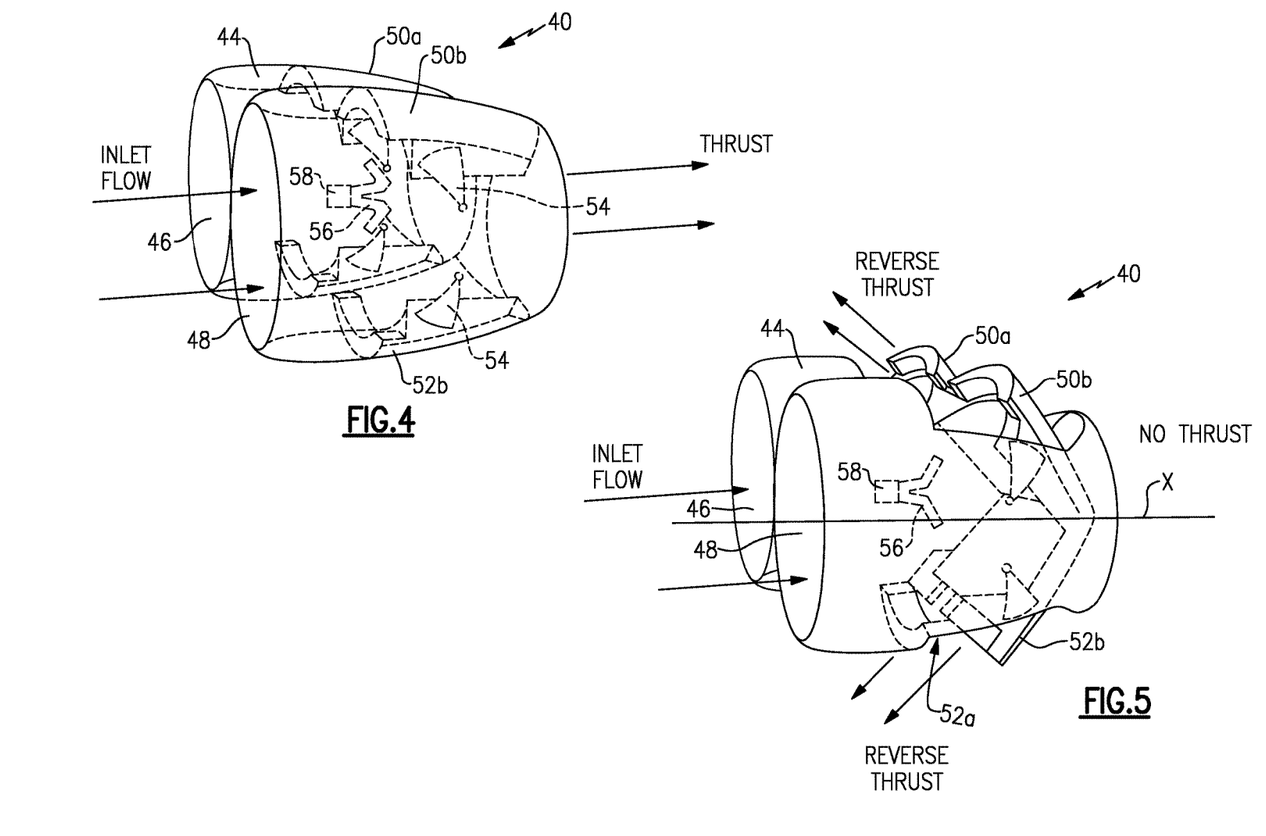
FIG. 4 is a partial sectional view of the example exit nozzle assembly in a cruise or in-flight position.
FIG. 5 is a partial sectional view of the example exit nozzle assembly in a deployed position thrust reversing position.

Referring to FIGS. 4 and 5, with continued reference to FIG. 3, the upper doors 50a, 50b and the lower doors 52a, 52b include pivots 54 supporting rotation between positions that vary the area through the corresponding nozzle 24, 26. An actuator 58 drives movement of the upper and lower doors 50a, 50b, 52a, and 52b through a linkage 56. In this example a single actuator 58 drives the single linkage 56 to move both the first and second upper doors 50a, 50b and both the first and second lower doors 52a, 52b. The first and second upper and lower doors 50, 52 are movable from the cruise or in-flight position shown in FIG. 4 to a thrust reverser position shown in FIG. 5.

Once an aircraft associated with the nozzle assembly 40 has landed, the actuator 58 drives the linkage 56 to move the first and second upper doors 50a, 50b and lower doors 52a, 52b to the deployed position (FIG. 5) in which the doors block the nozzles 24, 26. The first and second engines 16, 18, continue to produce propulsive flow against the deployed doors to generate a reverse thrust tending to slow the aircraft 12.

The first and second upper and lower doors 50, 52 close on the engine centerline axes X to redirect airflows through both bypass passages 60 from the respective fan sections 20, 22 as well as the exhaust gas flows from the respective core engine sections 28, 30. The combined and redirected bypass and exhaust gas flows generate a substantial reverse thrust to slow the aircraft 12.

Figure 6:
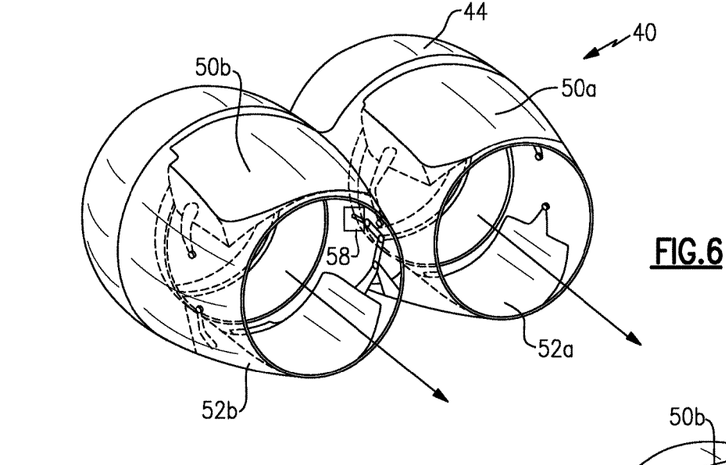
FIG. 6 is a rear perspective view of the example exit nozzle assembly in the cruise or in-flight position.
Figure 7:
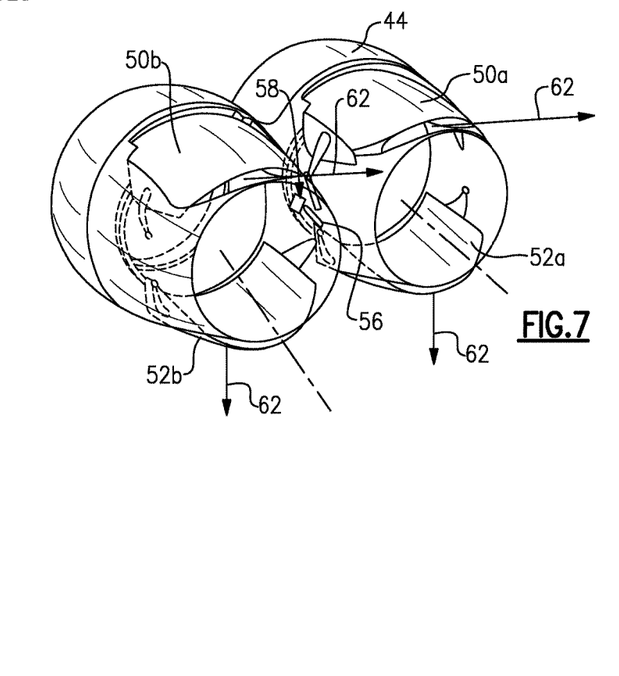
FIG. 7 is a rear perspective view of the example exit nozzle assembly in an open position.

Referring to FIGS. 6 and 7, the same actuator 58 and linkage 56 can be utilized to provide a varying cross-sectional area during flight operations to increase propulsive efficiency of the fan sections 20, 22. The example nozzle assembly 40 is further movable to an open position (FIG. 7) from the cruise or in-flight position shown in FIG. 6. The position illustrated in FIG. 6 is also referred to as a "stowed" position when referring to the thrust reverse function of the nozzle assembly 40.

During flight operations the area of each of the nozzles 24, 26 can be increased by pivoting the upper and lower doors such that an aft end of each of the doors moves radially outwardly as compared to the cruise position. The increased area provided by pivoting of the upper and lower doors 50, 52 radially outward generates additional flow area for additional flow indicated by arrows 62, which may aid in maintaining favorable fan operating characteristics such as a fan pressure ratio.

The nozzle assembly 40 provides the variable area nozzle function without additional structure as the upper and lower doors 50, 52 are driven by the same actuator 58 and linkage 56 that are utilized for the thrust reverser function.

Figure 8:
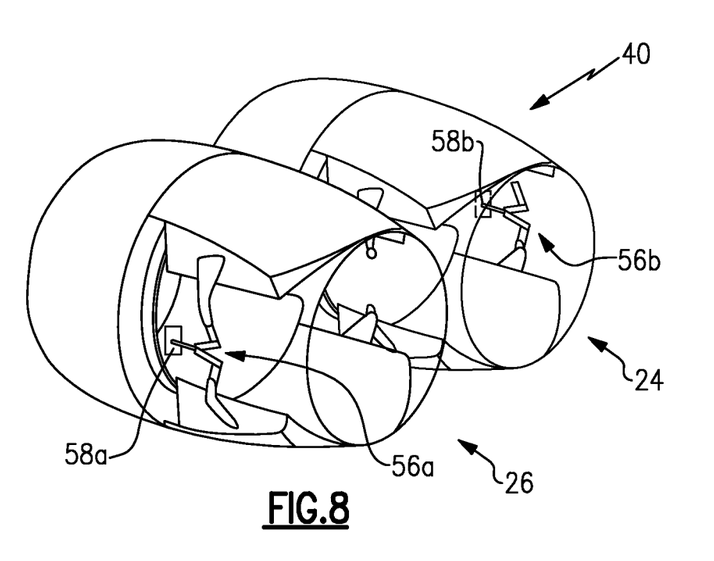
FIG. 8 is a perspective view of another example exit nozzle assembly including two actuator systems.

Referring to FIG. 8, the example nozzle assembly 40 may also include first and second actuators 58a, 58b for the first upper and lower doors 50a, 52a, independent of the second upper and lower doors 50b, 52b. Corresponding first and second linkages 56a and 56b are provided and driven by the corresponding first and second actuators 58a, 58b. Moreover, the first and second actuators 58a and 58b may also work in unison to open the doors 50a, 50b, 52a and 52b together. In this example, the actuators 58a and 58b are located on opposing sides of the nozzle assembly 40.

Figure 9:
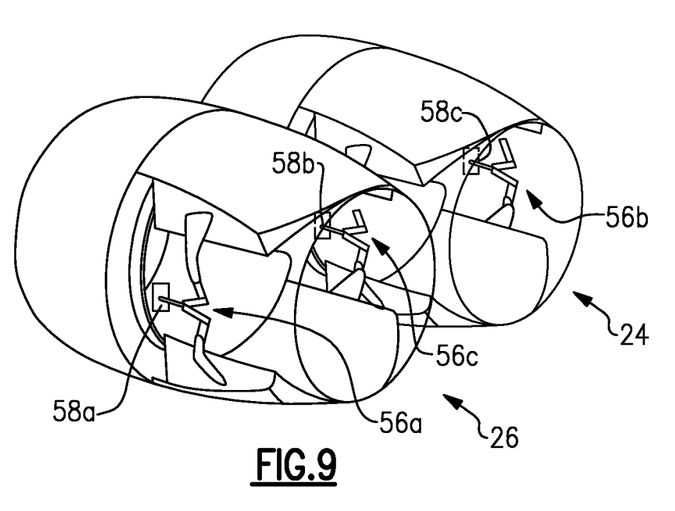
FIG. 9 is a perspective view of another example exit nozzle assembly including three actuator systems.

Referring to FIG. 9, the example nozzle assembly 40 may also include first, second and third actuators 58a, 58b and 58c that drive corresponding linkages 56a, 56b and 56c. The third actuator 58c may be arranged between the first nozzle 24 and the second nozzle 26 to provide a further degree of operational redundancy.

Accordingly, the example nozzle assembly 40 is mountable to an aircraft structure that provides both a thrust reversing function and a variable area nozzle function to improve propulsive efficiency.

Although various example embodiments have been disclosed, a worker of ordinary skill in this art would recognize that certain modifications would come within the scope of this disclosure. For that reason, the following claims should be studied to determine the true scope and content of this disclosure.

What is claimed is:

1. A nozzle assembly for a dual gas turbine engine propulsion system comprising:
    a housing mountable to an airframe structure and defining a first nozzle proximate to a first bypass passage of a first gas turbine engine and second nozzle proximate a second bypass passage of a second gas turbine engine;
    first and second upper doors supported within the housing;
    first and second lower doors supported within the housing; wherein each of the first and second upper doors and the first and second lower doors are pivotally mounted to the same common housing for movement between an open position, a stowed position and a deployed position, wherein in the deployed position, airflow through the first and second bypass passages is redirected relative to respective centerline axes of the first and second bypass passages, in the stowed position, airflow through the first and second bypass passage is not blocked by the first and second upper and lower doors and in the open position an eft end of the first and second upper and lower doors is moved radially outward of the stowed position;
    an actuator system supported on the housing and disposed between the first nozzle and the second nozzle to drive both the first and second upper doors and the first and second lower doors between the stowed position, the deployed position and the open position.

2. The nozzle assembly as recited in claim 1, wherein the first and second upper doors and the first and second lower doors close on a centerline of corresponding ones of the first and second bypass passages to redirect both bypass airflows and core airflows.

3. The nozzle assembly as recited in claim 1, wherein the actuator system is a single actuator disposed between the first and second bypass passages and coupled to each of the first and second upper doors and the first and second lower doors.

4. The nozzle assembly as recited in claim 1, including three actuator systems for moving the first and second upper doors and the first and second lower doors between the stowed position and deployed position.

* * * * *

UNITED STATES PATENT AND TRADEMARK OFFICE
CERTIFICATE OF CORRECTION

PATENT NO. : 10,161,358 B2  
APPLICATION NO. : 14/773958  
DATED : December 25, 2018  
INVENTOR(S) : Gabriel L. Suciu and Jesse M. Chandler It is certified that error appears in the above-identified patent and that said Letters Patent is hereby corrected as shown below:

In the Claims

In Claim 1, Column 6, Line 10; replace "an eft end" with --an aft end--

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*